United States Patent
Jelinek et al.

(10) Patent No.: US 10,890,550 B2
(45) Date of Patent: Jan. 12, 2021

(54) HIGH SENSITIVITY BROAD-TARGET POROUS GRAPHENE OXIDE CAPACITIVE VAPOR SENSOR

(71) Applicant: B.G. NEGEV TECHNOLOGIES & APPLICATIONS LTD. AT BEN-GURION UNIVERSITY, Beer-Sheva (IL)

(72) Inventors: Raz Jelinek, Reut (IL); Nagappa Teradal, Karnataka (IN); Ahiud Morag, Nes-Ziona (IL)

(73) Assignee: B.G. NEGEV TECHNOLOGIES & APPLICATIONS LTD. AT BEN-GURION UNIVERSITY, Beer-Sheva (IL)

( * ) Notice: Subject to any disclaimer, the term of this patent is extended or adjusted under 35 U.S.C. 154(b) by 0 days.

(21) Appl. No.: 15/671,490

(22) Filed: Aug. 8, 2017

(65) Prior Publication Data
US 2018/0059041 A1 Mar. 1, 2018

Related U.S. Application Data

(60) Provisional application No. 62/371,859, filed on Aug. 8, 2016.

(51) Int. Cl.
*G01N 27/30* (2006.01)
*G01N 27/416* (2006.01)
*G01N 27/22* (2006.01)

(52) U.S. Cl.
CPC ......... *G01N 27/304* (2013.01); *G01N 27/226* (2013.01); *G01N 27/308* (2013.01); *G01N 27/416* (2013.01)

(58) Field of Classification Search
None
See application file for complete search history.

(56) References Cited

U.S. PATENT DOCUMENTS

| | | | |
|---|---|---|---|
| 2004/0080325 A1* | 4/2004 | Ogura | G01N 27/225 324/664 |
| 2011/0186789 A1* | 8/2011 | Samulski | B82Y 30/00 252/514 |
| 2016/0223490 A1* | 8/2016 | Astley | G01N 27/4071 |
| 2016/0367151 A1* | 12/2016 | Le | A61B 5/01 |
| 2017/0276711 A1* | 9/2017 | Pak | G01D 5/24 |

OTHER PUBLICATIONS

Ye et al., The Investigation of Reduced Graphene Oxide/P3HT Composite Films for Ammonia Detection, Integrated Ferroelectrics, 154:1, 73-81 (2014). (Year: 2014).*
Kitsara et al., Sensors and Actuators B 127 (2007) 186-192. (Year: 2007).*
Bi et al., Ultrahigh humidity sensitivity of graphene oxide, Scientific Reports 3, Article No. 2714, pp. 1-7, (2013). (Year: 2013).*

(Continued)

*Primary Examiner* — Eli S Mekhlin
(74) *Attorney, Agent, or Firm* — Nixon & Vanderhye P.C.

(57) ABSTRACT

The present invention discloses a novel capacitive vapor sensor comprising porous immobilized graphene oxide (pGO) on an electrode surface. Also disclosed is an in-situ process for the preparation of this sensor and various uses thereof.

9 Claims, 12 Drawing Sheets
(3 of 12 Drawing Sheet(s) Filed in Color)

(56) References Cited

OTHER PUBLICATIONS

Srinivas et al., Porous graphene oxide frameworks: Synthesis and gas sorption properties, J. Mater. Chem., 2011, 21 11323. (Year: 2011).*
Dreyer et al., "Harnessing the chemistry of graphene oxide" *Chem. Soc. Rev.*, vol. 43: pp. 5288-5301 (2014).
Mi et al., "Preparation of graphene oxide aerogel and its adsorption for $Cu^{2+}$ ions" *Carbon*, vol. 50: pp. 4856-4864 (2012).
Rajesh et al., "Designing versatile heterogeneous catalysts based on Ag and Au nanoparticles decorated on chitosan functionalized graphene oxide" *Phys. Chem. Chem. Phys.*, vol. 17: pp. 11329-11340 (2015).
Rittersma, "Recent achievements in miniaturized humidity sensors—a review of transduction techniques" *Sensors and Actuators A*, vol. 96: pp. 196-210 (2002).
Zhao et al., "Efficient Preparation of Large-Area Graphene Oxide Sheets for Transparent Conductive Films" *ACS Nano*, vol. 4, No. 9: pp. 5245-5252 (2010).

\* cited by examiner

Figure 2A
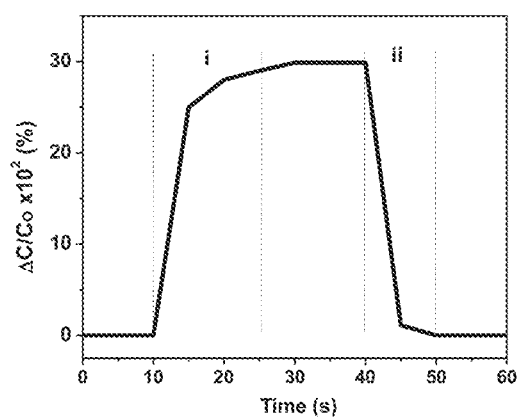
Figure 2B
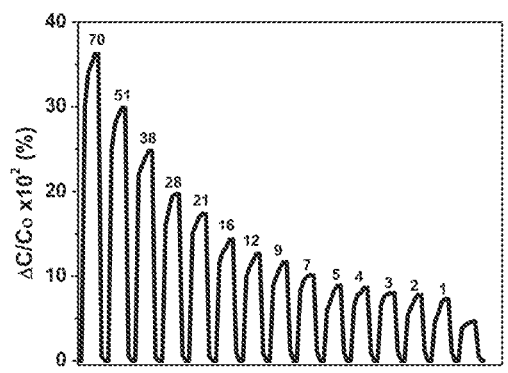
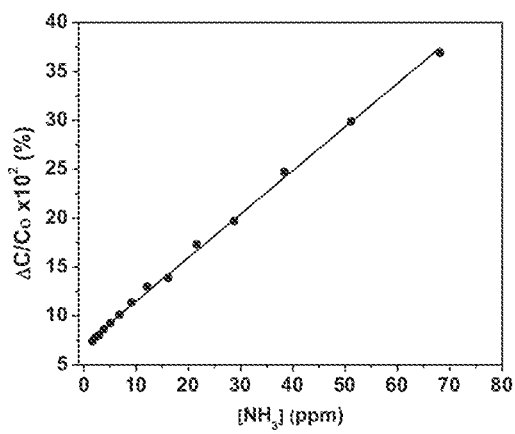
Figure 2C

Figure 4B
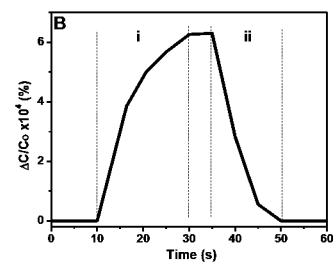
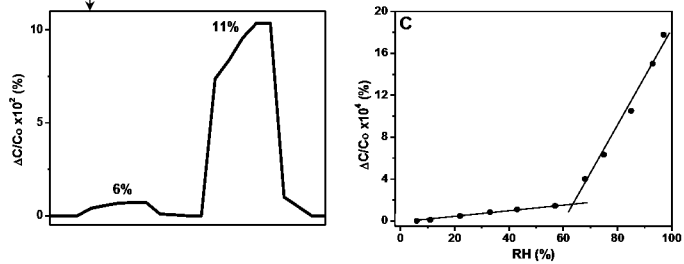
Figure 4A
Figure 4C

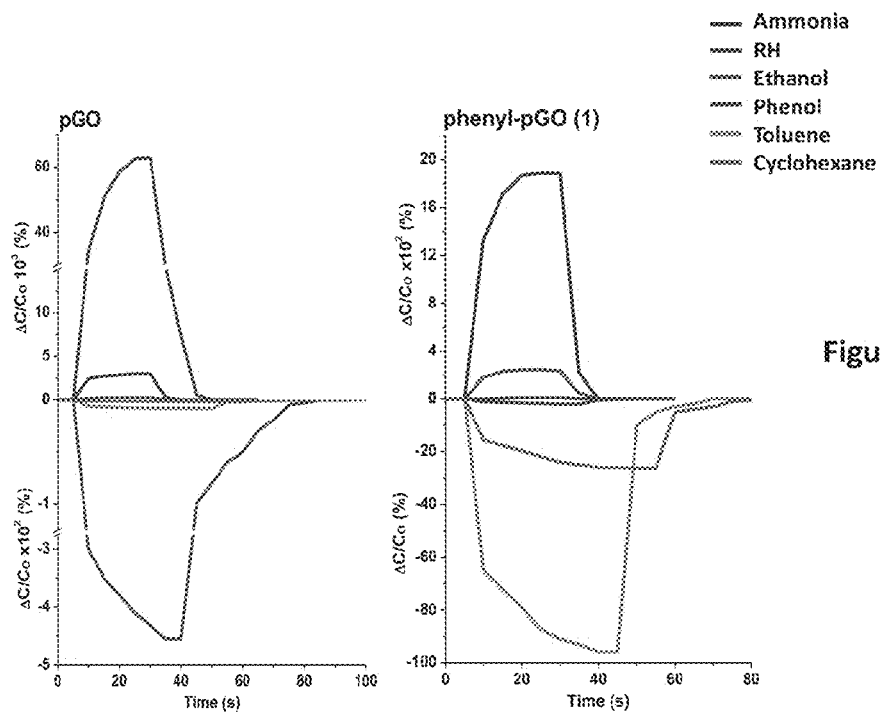
Figure 6A
Figure 6B
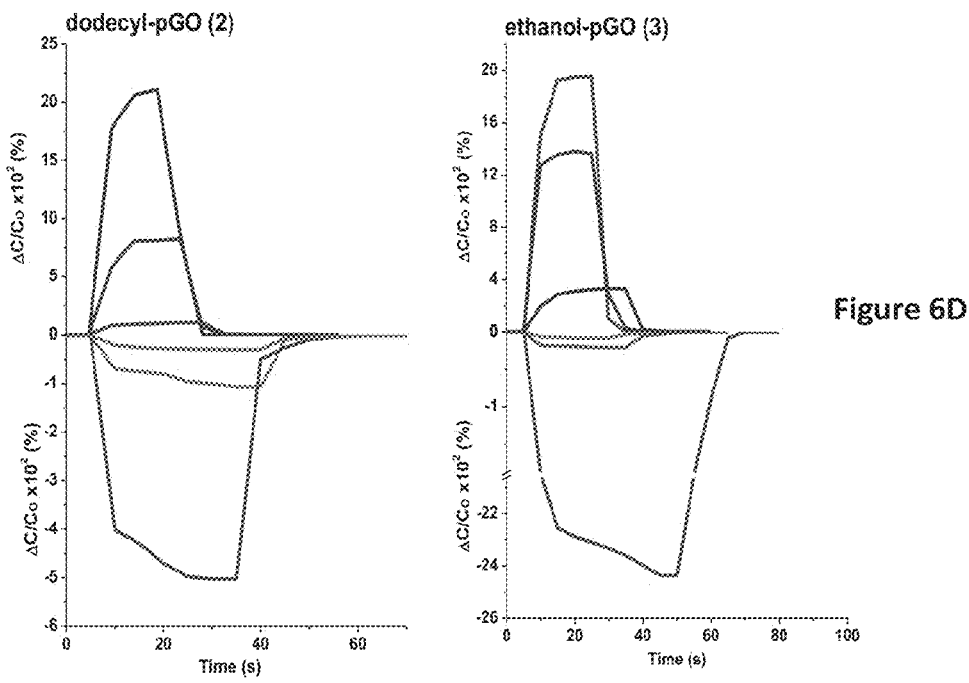
Figure 6C
Figure 6D

Relative Humidity

Ammonia

Figure 11A
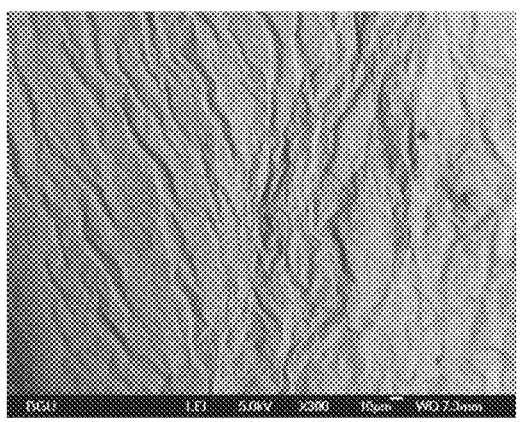
Figure 11B
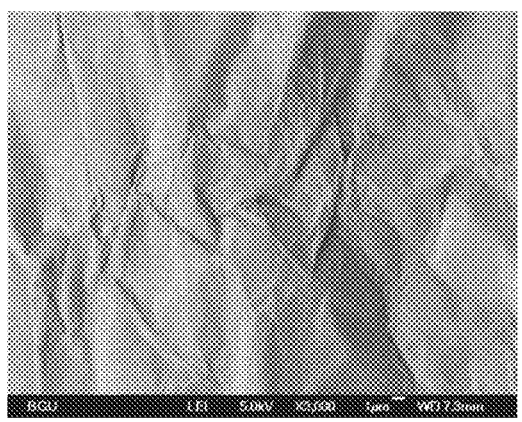
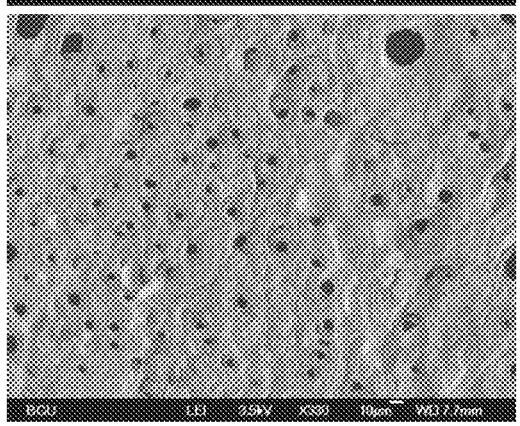
Figure 11C
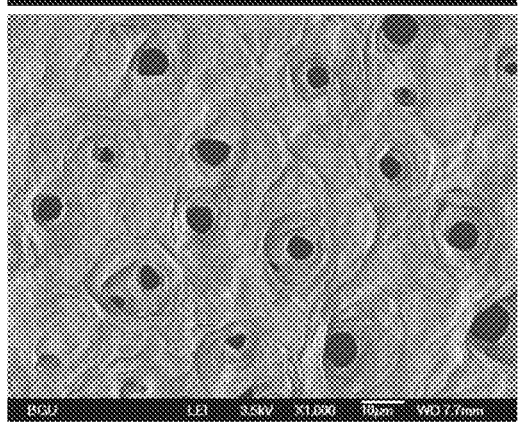
Figure 11D

HIGH SENSITIVITY BROAD-TARGET POROUS GRAPHENE OXIDE CAPACITIVE VAPOR SENSOR

This application claims priority to U.S. Provisional Application No. 62/371,859 filed Aug. 8, 2016, the entire contents of which are hereby incorporated by reference.

BACKGROUND OF THE INVENTION

Capacitive vapor sensors, which operate via modulation of the capacitance by physical or chemical adsorption of volatile molecules onto the sensor material, are attractive due to their low response times, reproducibility, low power consumption, and room temperature applicability. Since capacitive sensors have no static power consumption, they are suitable for use in energy-constrained applications, such as low-power battery-operated systems and wireless sensor networks. An important advantage of capacitance-based gas sensing is the fact that detection properties are determined by dielectric modulation, generally exhibiting higher fidelity and sensitivity than charge effects which are dominant in resistance-based sensors. While capacitive gas-phase sensor technologies using diverse classes of materials have been reported (Z. M. Rittersma, Sens. Actuator A-Phys. 2002, 96, 196) significant challenges are still encountered, including low sensitivity and low dynamic range, insufficient reproducibility, and relatively narrow range of molecular targets.

Therefore there is a long felt need of improved capacitive vapor sensors, which will have high sensitivity, a wide dynamic range, high reproducibility, and relatively wide range of molecular targets.

The type and properties of the dielectric medium are the most critical aspects of capacitive vapor sensors. The sensor substrate needs to display high surface area available for adsorption of vapor molecules, undergo pronounced dielectric modulation upon gas uptake, and should exhibit high physical stability. Varied materials, usually porous substances, have been used in capacitive vapor sensors, including polymers, metal organic framework (MOF) materials, and graphene oxide (GO).

GO, in particular, constitutes a potentially useful dielectric constituent for capacitive gas sensors due to its ease of synthesis, high surface area of the graphene sheets, and abundant hydroxyl and carboxyl moieties suppressing proton conductivity thus enhancing the dielectric properties.

Porous graphene oxide (pGO) is a three dimensional material, in which graphene oxide layers are self-assembled. It can be prepared by a variety of methods, such as hydrothermal (Kong D. et al, Adsorption, DOI 10.1007/s10450-016-9798-5), irradiation (C. Yu et al. Carbon 105 (2016) 291e296], polymerization and grafting (Pourjavadi et al., RSC Adv., 2016, 6, 10430), template based (Luo, et al., Applied Surface Science 366 (2016) 46-52), electroplating deposition (Wang el al., Nanotechnology 26 (2015) 055401, 6pp), oxidative coupling of primary amines (Su et al., J. Am. Chem. Soc. 2015, 137, 685-690), Steam Etched (Han et al., J. Am. Chem. Soc. 2011, 133, 15264-15267), expansion of graphene oxide (GO) sheets (Gadipelli et al., J. Mater. Chem., 2011, 21, 11323). For example, WO 2013/191654 teaches a method comprising: preparing graphene oxide sheets from graphite at 40° C. to 170° C.; providing a graphene oxide suspension of these sheets; heating the suspension with a base at and heating the mixture of the base-treated graphene oxide sheets with an acid.

Other methods of preparing pGO are disclosed by T. H. Han et al. (*J. Am. Chem. Soc.* 2011, 133, 15264) and Y. Lei et al. (*Chem. Phys. Lett* 2014, 593, 122).

X. Mi et al. teach the preparation of pGO by a freeze-drying treatment (Carbon 2012, 50, 4856). Briefly, The GO suspension (1% g/cm$^3$) is poured into a plastic tube and the tube is placed in an insulated Styrofoam. Then the samples are allowed to freeze for about 20 minutes. The solidified GO/water mixture was freeze-dried for 48 hours under vacuum. The obtained material is again a porous GO.

pGO has been recently employed in varied applications including filtering of organic pollutants and heavy metals, catalysis, dye adsorption, and antibacterial applications. However, while it may seem as a possible dielectric substrate since it has a far greater porous surface area compared to GO, this application has never been achieved since pGO was never successfully adsorbed on the surface of an electrode, and therefore could not be applied as a dielectric substrate, for example as a sensor.

In fact, the inventors of the present invention have now shown that preparing pGO using previously-reported methods, such as complete freeze drying of graphene oxide (such as the process taught by X. Mi et al. 2012), and then placing the obtained pGO upon an electrode surface failed since the pGO layer did not attach to the electrode surface and hence a working sensor could not be produced.

BRIEF DESCRIPTION OF THE DRAWINGS

FIGS. 2A-2C depict $NH_3$ sensing results of the present invention; FIG. 2A depicts response (i) and recovery (ii) times at 50 ppm ammonia; FIG. 2B depicts capacitance modulation in different ammonia vapor concentrations indicated in ppm above the relative capacitance signals; FIG. 2C depicts graphical representation of the percentage capacitance response, high-lighting the linearity in the range of 1-70 ppm.

FIG. 3A depicts the GO/IDE (i. response time-210 seconds; ii. recovery time-200 seconds) and FIG. 3B depicts the pGO/IDE (i. response time-20 seconds; ii. recovery time-10 seconds).

FIGS. 4A-4C depict the humidity sensing. FIG. 4A depicts the capacitance modulation induced by different values of relative humidity (RH %); The inset below shows magnification of the capacitive response to 6% and 11% RH, respectively. FIG. 4B depicts the response (i) and recovery (ii) profile recorded at 75% RH; FIG. 4C depicts the concentration-dependent capacitance response graph.

FIG. 5A depicts sensing of Ethanol (200 ppm); FIG. 5B depicts sensing of phenol (150 ppm). Percentage response (left) and response/recovery time profiles (right. i and ii correspond to response and recovery times, respectively).

FIGS. 6A-6D depict the vapor specificity using functionalized pGO as the dielectric core of the capacitive sensors of the present invention. Shown are the response/recycling curves recorded upon addition of the vapors indicated according to the color code, all at a concentration of 180 ppm. Humidity value was 75%. FIG. 6A depicts non-functionalized pGO; FIG. 6B depicts Phenyl-pGO (GO derivative 1); FIG. 6C depicts dodecyl-pGO (GO derivative 2); FIG. 6D depicts ethanol-pGO (GO derivative 3).

FIG. 7A depicts polar vapors (positive capacitance changes); FIG. 7B depicts non-polar vapors (negative capacitance changes). The concentration of all vapors was 180 ppm and the relative humidity was 75%.

FIG. 8B depicts the sensing of methanol; FIG. 8C depicts the sensing of acetonitrile; FIG. 8D depicts the sensing of benzene.

FIGS. 11A-11D: FIGS. 11C and 11D depict SEM images of porous graphene oxide sensors prepared according to the process of Example 1B, in comparison to non-porous graphene oxide sensors, shown by FIGS. 11A and 11B.

DETAILED DESCRIPTION OF THE INVENTION

Figure 1A:
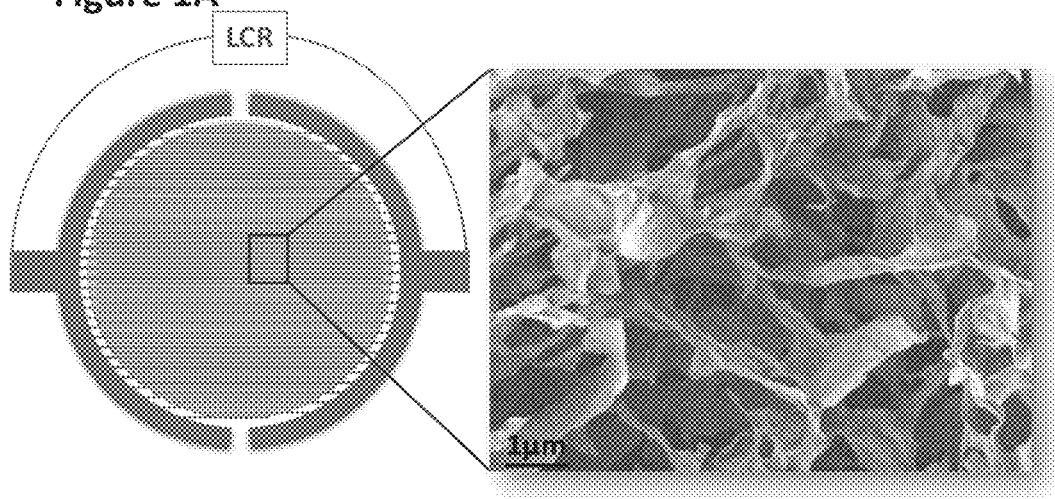
FIG. 1A depicts a scheme of the capacitor and the morphology of the porous graphene oxide (pGO) vapor sensor matrix of the present invention, showing the two electrodes and dielectric pGO medium between them (left); scanning electron microscopy (SEM) image of the electrode-grown pGO dielectric substance (right) underscores the porous network.

Surprisingly, the inventors have now developed a new type of capacitive vapor sensor comprising porous graphene oxide (pGO) produced through a novel in-situ assembly of the pGO upon the electrode surface, whereas the sensor produced by this process has the pGO immobilized on the electrode surface.

Thus, according to a first aspect of the invention, there is now provided a capacitive vapor sensor comprising porous graphene oxide adsorbed on an electrode.

The term "porous graphene oxide" refers to a three dimensional material, in which graphene oxide layers are self-assembled, as opposed to "graphene oxide" (GO), or "on-porous graphene oxide" which does not have display this three dimensional structure. The two structures of graphene oxide can be easily distinguished by a number of properties, as known to a person skilled in the art.

It is understood that the porous graphene oxide is adsorbed on the electrode surface. The term "electrode surface" includes the available surface area of the electrode, and is not limited to the outer geometric surface area of the electrode.

The term "sensor", used interchangeably with the term "detector", may particularly denote any device which may be used for the detection of an analyte. Examples for sensors which may be realized according to exemplary embodiments are vapor sensors, humidity sensors, etc.

As used herein, the term "analyte" used interchangeably with the term "target molecule" indicates a molecule whose presence, absence, or concentration one is interested in determining.

The term "vapor sensor", used interchangeably with the term "gas sensor", refers to any device which may be used for the detection of an analyte comprising particles in the gas phase. For example, the vapor sensor may be used for the selective detection of a gas in a gas mixture.

According to preferred embodiments of the invention, the analyte or target molecule is in a vapor form, and thus the sensor is a vapor sensor and detects the presence, absence, or concentration of vapor target molecules. For example, the sensor of the present invention may be used to determine whether or not the amount of $CO_2$ vapor in the sample exceeds a pre-determined level.

The term "capacitive vapor sensor" refers to a capacitor having an electric characteristic which is modifiable by a sensor event, in the present case, a sensor that changes its dielectric properties, such as capacitance, in contact with the vapor target molecules.

The term "capacitor" refers to a device for storing electrostatic energy through the separation of electric charges of opposite signs. All capacitors share a common structure of a pair of parallel metallic electrodes or "plates" separated by a layer of dielectric material. The capacitor is "charged" by transferring electric charge from one electrode to the other under the action of an applied potential difference, thus establishing an electric field within the dielectric material The dielectric material (also termed dielectric medium, dielectric core, or dielectric substance) of the capacitors of the present invention is the porous graphene oxide (pGO), prepared in situ on the electrode surface using the novel process of the present invention. As can be seen in FIGS. 1 and 11, the porosity of the graphene oxide can be confirmed by SEM images of the coated electrode surfaces.

As used herein the term "capacitance" is expressed by the equation C as a function of voltage=dQ/dV where C is capacitance measured in farads, Q is the quantity of charge in coulombs, and V is the applied voltage in volts. Depending upon its magnitude, capacitance can be expressed in farads, F, microfarads, $\mu F=10^{-6}$ F, or picofarads $pF=10^{-12}$ F.

As can be seen in the figures hereinbelow, the change in capacitance is often provided as $\Delta C/C_0$ (%).

The novel pGO capacitive vapor sensor produced by the novel process of the present invention exhibited extraordinary sensing properties, including extremely high sensitivity, wide dynamic range, rapid response and recovery times, and capability for detection of broad range of target molecules, including, but not limited to, humidity, ammonia, organic vapors, polar and non-polar volatile molecules.

The term "volatile molecule" or "volatile material" as used herein, refers to a material that is vaporizable at room temperature and atmospheric pressure without the need of an energy source.

The term "organic vapor" means a vaporizing gas of an organic substance which is in liquid form at ordinary temperature under ordinary pressure. The term "organic vapor" also encompasses "volatile organic compounds" (VOCs). As defined hereinbelow.

Examples of organic vapors include alcohols, such as methanol and ethanol, amines such as trimethylamine, aldehydes such as acetaldehyde, aliphatic hydrocarbons having from 5 to 16 carbon atoms, aromatic hydrocarbons such as benzene and toluene, ketones, such as acetone and methyl ethyl ketone, and halogenated hydrocarbons such as methyl chloride and chloroform.

As used herein the term "organic substance" refers to materials that contain carbon and hydrogen.

The term "volatile organic compounds" (VOC) refers to organic chemical compounds having significant vapor pressures. VOCs are numerous, varied and include man-made (anthropogenic) as well as naturally occurring chemical compounds. Many VOCs are hazardous and their monitoring is of particular importance. There is no universally accepted definition of VOCs. Some regulatory entities define them in terms of their vapor pressure at ordinary temperatures, or their normal boiling points, or how many carbon atoms they contain per molecule, and others define them in terms of their photochemical reactivity.

The term "non-polar volatile compounds" includes linear and cyclic siloxanes, volatile alkanes, volatile cycloalkanes, volatile chlorocarbons, volatile fluorocarbons and combinations thereof. The term "polar volatile compounds" includes volatile alcohols, volatile esters, volatile ketones, volatile ethers, solubilized water, and combinations thereof. It should be noted that polar vapors result in positive capacitance changes (as in FIG. 7A) and non-polar vapors result in negative capacitance changes (as in FIG. 7B).

As used herein the term "nonpolar organic compounds" includes aliphatic and aromatic hydrocarbon; while the term "polar organic compounds" refers to organic molecules which have a permanent dipole and includes alcohols, ethers, ketones, aldehydes, acids, and esters, as well as organic halides, nitrogen compounds, sulfur compounds, phosphorus compounds, and polar derivatives thereof.

The term "humidity" refers to water vapor and may in particular denote an absolute humidity, a mixing ratio or a humidity ratio, a relative humidity, and/or a specific humidity of a gas-liquid mixture such as an air-water mixture. The term "humidity sensor" may particularly denote any device which may be used for the detection of an analyte comprising liquid particles such as water particles. For example, the humidity sensor may be used to detect to measure humidity, i.e. an amount of a water vapor in the air.

As used herein, the term "capacitive sensor" designates a sensor, which generates a signal responsive to the influence of what is being sensed (such as an analyte) upon an electric field. A capacitive sensor generally comprises at least one antenna electrode, to which is applied an oscillating electric signal and which thereupon emits an electric field into a region of space proximate to the antenna electrode, while the sensor is operating. The sensor comprises at least one sensing electrode—which may be identical with or different from transmitting antenna electrodes—at which the influence of the analyte on the electric field is detected.

The electrode used to provide the sensor of the present invention can be any type of interdigitated electrode, which can provide rapid response, low impedance, allowing for simple detection of impedance changes, e.g. via high current changes at constant voltage.

As used herein, the term "interdigitated electrodes" or "interdigitated microelectrodes" indicates at least two complementarily-shaped electrodes, wherein "branches" or "fingers" of each electrode are disposed in an alternating fashion. It should be understood that other shapes of electrodes may also be suitable for use as interdigitated electrode. For example, a pair of comb-shaped electrodes may be used, wherein the "fingers" of each electrode are positioned in an alternating-fashion. In some cases, a pair of interdigitated electrodes may be used as the working electrodes in devices of the invention.

The IDE can comprise gold, silver, platinum, or indium tin oxide (ITO).

Preferably, the IDE comprises gold, silver or platinum.

Gold is a readily available material. Therefore, more preferably, the IDE comprises gold.

The term "immobilized" is used interchangeably with the terms "adsorbed", "attached", "interacted" and similar terms, and is intended to mean that the pGO does not freely diffuse away from the electrode.

The adsorption of the pGO to the electrode surface can be easily detected by using scanning electron microscopy (SEM), as shown in FIGS. 1A, 1B and 11A-11D further below. For example, the SEM image of FIG. 1A shows the porous network of the electrode-grown pGO dielectric substance, for a pGO prepared according to the process of Example 1A. Yet further, in FIGS. 11A-11D which depict SEM images of graphene oxide (FIGS. 11A and 11B) and porous graphene oxide (FIGS. 11C and 11D) prepared according to the process of Example 1B, it is again evident that pores were obtained by the in-situ process of the present invention.

The immobilization may be the result of either chemical or physical bonding between the GO or the obtained pGO and the electrode surface. This physical or chemical attachment or adsorption occurs in the first step of the electrode preparation process (i.e. drying of the GO modified electrode at room temperature).

Without being bound to any specific theory, it is believed that the attachment of the GO and pGO to the electrode occurs through weak physical interaction between the functional groups (hydroxyl, epoxy, and carboxyl groups) of the graphene oxide and the gold electrode surface.

FIGS. 6A-6D demonstrate that significant specificity among different vapor molecules was achieved through chemical derivatization of the pGO framework. Specifically, to record the response/recovery capacitance curves presented in FIGS. 6A-6D the inventors employed capacitive sensors for which the dielectric cores comprised of pGO that was covalently functionalized with different residues according to the reaction schemes outlined in FIG. 12.

Therefore, the porous graphene oxide, prepared according to the novel process of the present invention can be either functionalized or non-functionalized, as detailed hereinbelow. For example, the pGO may be based on different functionalized-GO materials, such as phenyl-GO, dodecyl-GO, ethanol-GO and the like, prepared through the reaction between an amine group of the functionalizing agent [aniline, dodecylamine or ethanolmine] and an acyl chloride group attached to the GO. Additional methods of attachment of functional groups may be used instead of the acyl chloride reaction, as known by a person skilled in the art.

Cross-selectivity constitutes an important aspect of effective vapor sensors, as can be seen in FIGS. 6A-6D. For example, FIG. 6B demonstrates that using phenyl-pGO (starting from GO derivative 1, FIG. 12) results in excellent cross-selectivity for ammonia (among polar gas molecules, generating positive capacitance change) and toluene (among non-polar vapors, producing negative capacitance change). While FIG. 6A indicates some capacitance response to ethanol (polar vapor) and cyclohexane (non-polar), hardly any capacitance changes were observed for the other vapors tested. This cross-selectivity is particularly notable in case of humidity; the capacitance sensing data in FIG. 6B demonstrate that pGO derivative 1 could be used for vapor sensing even in high humidity environments.

Dodecyl-pGO (GO derivative 2, FIG. 12) exhibited the highest sensitivity towards ammonia, while ethanol vapor in this case gave rise to a lower capacitance response (FIG. 6C). Humidity (RH of 75%) produced more pronounced signal when using GO derivative 2 as the dielectric substance, compared to the capacitive sensor comprising 1 (shown in FIG. 6B) albeit still significantly lower than the ammonia signal. Among the non-polar vapors tested, FIG. 6B reveals significant cross-selectivity in case of phenol, which generates a strikingly different sensor response compared to the case of GO derivative 1 (which exhibited the highest response to toluene, FIG. 6B). Yet, distinct cross-selectivity profile was apparent in case of ethanol-pGO (GO derivative 3, FIG. 6D). Different than the pGO derivatives depicted in FIG. 6B and FIG. 6C, the capacitive sensor comprising GO derivative 3 exhibited significantly more pronounced signal upon addition of ethanol compared to ammonia vapor. More pronounced capacitance change was also apparent in comparison to humidity (FIG. 6D). The selectivity of the capacitive sensor comprising the GO derivative 3, between phenol and all other non-polar vapors examined was dramatic, as the signal produced by phenol was orders of magnitude more pronounced in comparison to toluene or cyclohexane (FIG. 6D). Interestingly, the non-functionalized pGO yielded the most pronounced cross-selectivity towards humidity and phenol (FIG. 6A), pointing to preferred practical usage of this substance in capacitive sensors designed to detect these vapors.

Without being bound to any specific theory, the cross-selectivity achieved by using different functionalized pGO scaffolds as the adsorbent dielectric (FIGS. 6A-6D) is likely ascribed to modification of the pGO pore surface properties, specifically through the display of different residues, which intimately affect the interactions of vapor molecules with the porous matrix. For example, the non-functionalized pGO displays abundant hydroxide and carboxylic moieties which account for the very high capacitance signal induced through interactions with the OH units of water and phenol molecules (FIG. 6A). In contrast, the hydrophobic phenyl residues in GO derivative 1 exhibit much less affinity to water molecules, giving rise to lesser adsorption of water vapor and consequently negligible capacitance signal (FIG. 6B).

Figure 12:
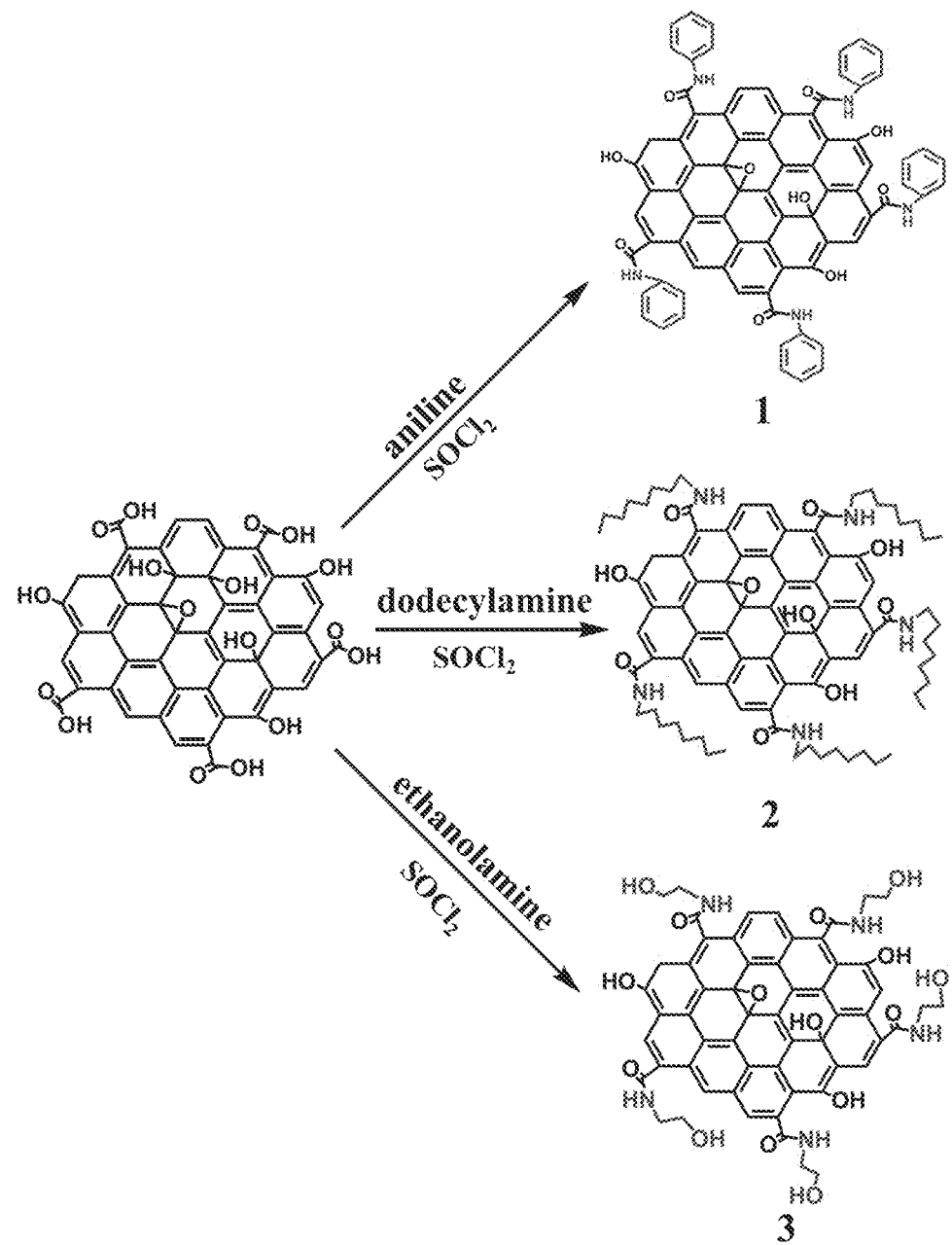
FIG. 12 is a scheme depicting several preparation methods of functionalized pGOs

The ammonia specificity apparent in FIG. 6B might be ascribed to the affinity between the ammonia molecules and aromatic units introduced into the pGO scaffold through the reaction with aniline (e.g. FIG. 12). Such affinity possibly also plays an important role in affecting the cross-selectivity of the capacitive sensor comprising GO derivative 2 to ammonia (FIG. 6B). Similarly, without being bound to any specific theory, ethanol vapor molecules probably attract to the respective ethanol residues displayed upon the pGO surface in GO derivative 3, reflected in the highest capacitance response of the sensor towards ethanol (FIG. 6D). The distinct cross-selectivity profiles of the functionalized pGO in case of non-polar vapor molecules in FIGS. 6A-6D presumably correspond to modulation of the distribution of polar/non-polar surface domains within the pGO pores.

The dramatic differences in capacitance response between polar and non-polar vapors are likely due to the distinct effects of the adsorbed gas molecules upon charge distribution within the pGO pores and concomitant dielectric permittivity. The polar vapors examined exhibit high dielectric constants (above 10) while the non-polar vapors display low dielectric constants (lower than 5) thus exhibiting only electronic polarizability. The polarizability likely plays a prominent role lowering the capacitance as it induced localized dipole moments and associated change in electrical double layer. Overall, the divergent capacitance response between polar and non-polar vapors implies that the molecular interactions and orientation within the pGO pores intimately affected sensor response.

Thus, according to one preferred embodiment of the invention, graphene oxide is a functionalized graphene oxide.

Figures 7A, 7B:
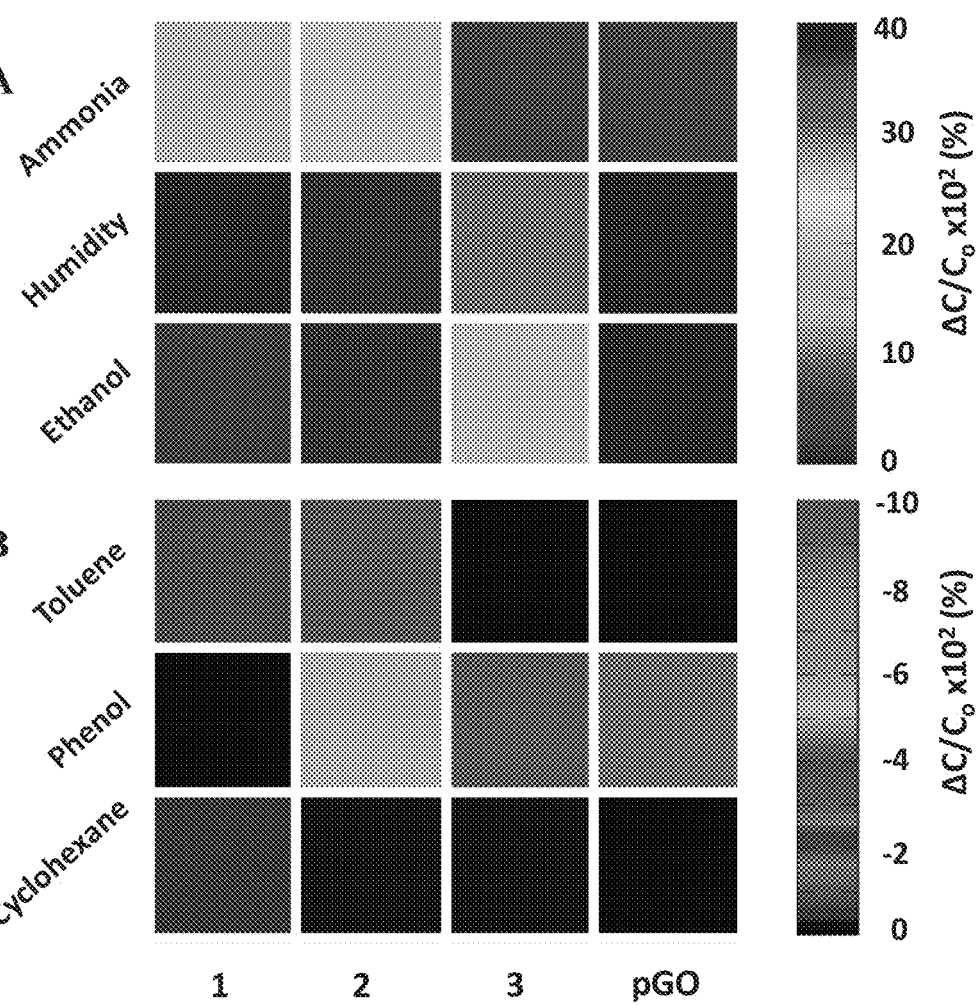
FIGS. 7A and 7B depict an array-based color code identification of different vapors using the functionalized pGO capacitive sensor of the present invention. The colors indicated in the diagram correspond to the percentage capacitance response, according to the color keys shown on the right.

FIGS. 7A and 7B depict an array-based visual scheme for identification of vapor molecules using pGO and derivatives 1-3 (of FIG. 12) as array elements. Essentially, the color fingerprints outlined in FIGS. 7A and 7B reflect the degrees of capacitance responses (positive response in case of polar vapors, negative responses for non-polar vapors), drawn according to the color codes shown on the right. FIGS. 7A and 7B nicely demonstrate that each of the vapor molecules tested could be assigned a distinct color "fingerprint" according to the relative responses of the capacitive sensors employing the different pGO derivatives. It is expected that the array based strategy (possibly including more functionalized pGO substances as array elements) would enable identification of other vapor molecules.

Thus, according to another preferred embodiment of the invention, there is now provided a capacitive vapor sensor, constructed as an array of at least two array elements, each element comprising the sensor of the present invention, further whereas each array element comprises a different functionalized or non-functionalized porous graphene oxide molecule.

In practice, as can be seen in FIGS. 7A and 7B, a person skilled in the art can easily prepare an array-based color code identification of the target vapor analytes using the functionalized pGO capacitive sensor array of the present invention, such that the colors indicated in the diagram would correspond to the percentage capacitance response, according to predetermined color keys at a specific concentration, and under similar conditions. This color code diagram can then be used to identify and fingerprint each target analyte and distinguish it from other tested analytes, since the combination of color responses for different array elements is expected to be a unique combination for any given target analyte.

Figure 8A:
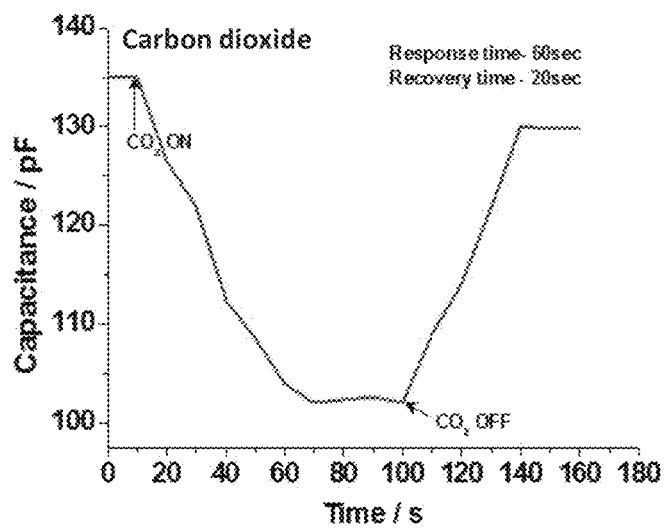
FIG. 8A depicts $CO_2$ and FIGS. 8B-8D depict other VOCs sensing. The percentage response vs. concentrations (left) and response/recovery time profiles (right. i and ii correspond to response and recovery times, respectively).
Figure 8B:
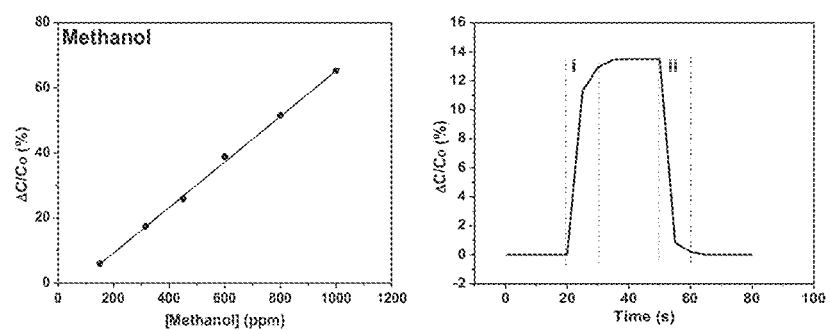
Figure 8C:
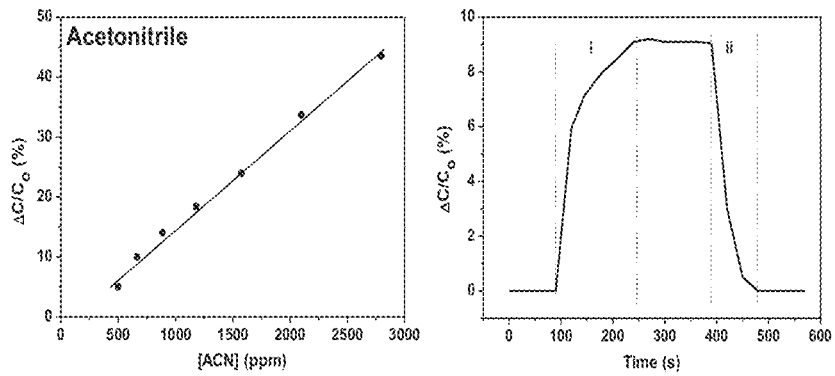
Figure 8D:
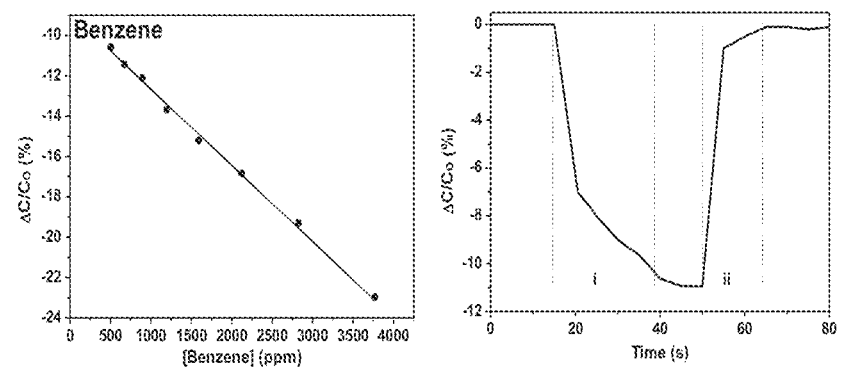

As can be seen in FIGS. 8A-8D, the non-functionalized pGO sensor of the present invention is also useful in the detection of a variety of analytes. For example, FIG. 8A shows a response time 60 seconds, and a recovery time 20 seconds for $CO_2$ detection. FIGS. 8B-8D show methanol, acetonitrile and benzene detection, which indicates the versatile utility of demonstrated regular non-functionalized pGO electrode for gases and VOCs. Therefore, the array may also comprise a non-functionalized porous graphene oxide molecule as one of the array elements.

In the context of the present invention, the term "array" shall refer to any arbitrary one-, two- or three-dimensional arrangement of a plurality of units called "array elements" (also termed "array units" or "cells"). Typically such an array will be two-dimensional and preferably planar, and its cells will optionally be arranged in a regular pattern, for example a grid pattern, such as in rows and columns. In the present case, each array element is a porous graphene oxide molecule, either functionalized or non-functionalized by different functional groups, embedded on an electrode according to the in-situ process of the present invention, as detailed in Examples 1A, 1B and 1C.

The term "functionalized" as used herein, refers to a chemical derivative of a graphene oxide molecule or of a porous graphene oxide molecule, this derivative being a graphene oxide molecule or a porous graphene oxide molecule modified to link to one or more functional groups, as defined hereinbelow, thereby enhancing the detection of one or more specific target analytes.

The term "non-functionalized" as used herein refers to a graphene oxide molecule or a porous graphene oxide molecule which have not been modified to include a functional group, as defined hereinbelow.

The term "functional group" means an atom or group of associated atoms that, at least in part, defines the structure and determines the properties of a particular family of chemical compounds. Functional groups generally have characteristic properties and may control, in part, the reactivity of a molecule as a whole. Functional groups include, but are not limited to, hydroxyl groups, thiol groups, carbonyl groups, carboxyl groups, sulfonate groups, sulfide groups, ether groups, halogen atoms, amino groups, cyano groups, nitro groups, and the like. Compounds that are generally classified (structurally and/or functionally) according to functional groups include, but are not limited to, alkanes, alkenes, alkynes, aromatic compounds, halides, alcohols, ethers, esters, amines, imines, imides, carboxylic acids, amides, acid halides, acid anhydrides, nitriles, ketones, aldehydes, carbonates, peroxides, hydroperoxides, carbohydrates, acetals, epoxides, sulfonic acids, sulfonate esters, sulfides, sulfoxides, thioethers, thiocyanates, disulfides, phosphonic acids, phosphate esters, phosphines, azides, azo compounds, nitro compounds, nitrates, nitriles, nitrites, nitroso compounds, thiols, cyanates, and isocyanates, for example.

The functional groups may be hydrophobic or hydrophilic.

Some non-limiting examples of hydrophobic groups include lower alkyl groups, alkyl groups having 7, 8, 9, 10, 11, 12, or more carbon atoms, substituted alkyl groups, aryl groups, substituted aryl, saturated or unsaturated cyclic hydrocarbons, heteroaryl, heteroarylalkyl, heterocyclic, and corresponding substituted groups.

Some non-limiting examples of hydrophilic groups include hydroxyl, methoxy, phenol, carboxylic acids and salts thereof, methyl, ethyl, and vinyl esters of carboxylic acids, amides, amino, cyano, ammonium salts, sulfonium salts, phosphonium salts, polyethylene glycols, epoxy groups, acrylates, sulfonamides, nitro and the like.

As detailed in Example 1C, functionalized graphene oxide molecules, to be used in the preparation of the array elements, were prepared by first activating the carboxylic functional groups of graphene oxide. This was done by suspending the graphite oxide in $SOCl_2$ to obtain a GO—COCl suspension. Then, this acyl chloride-GO suspension was reacted with a suitable amine solution, containing the required functional group or having a similar structure. For example to prepare phenyl-GO (FIG. 12, GO derivative 1) the GO—COCl was reacted with aniline, to prepare dodecyl-GO (FIG. 12, GO derivative 2) the GO—COCl was reacted with dodecylamine, and to prepare the ethanol-GO (FIG. 12, GO derivative 3) the GO—COCl was reacted with ethaolamine.

It should be noted that a person skilled in the art would be able to provide other methods of functionalizing the GO and the pGO of the present invention, and therefore the present invention is not limited to the functionalization process provided herein, which is provided as an example only, in a non-limiting manner.

Then the sensor array elements were prepared according to the same in-situ process outlined above for graphene oxide, replacing the graphene oxide by functionalized graphene oxide molecules.

As indicated above, it is expected that the array based strategy (possibly including more functionalized pGO substances as array elements) would enable identification of other vapor molecules.

The term "in situ" as used herein refers to fabrication of the porous GO structure onto the electrode, rather than pre-fabricating the porous GO and then placing it onto the electrode.

The novel in-situ process taught by the present inventors to produce the novel sensor of the present invention is based on two steps, wherein in the first step the graphene oxide is adsorbed on the electrode surface, and in the second step, only after the initial adsorption, pores are formed in the adsorbed graphene oxide, in a number of possible ways, to obtain porous graphene oxide well adsorbed on the electrode surface.

As detailed throughout the description, the present process has surprisingly succeeded in providing a novel capacitive vapor sensor based on pGO, while attempts to prepare a sensor without the novel steps of the present process, have failed.

Thus, according to yet another aspect of the invention, there is now provided an in-situ process for preparing the sensor described hereinabove, this process comprising:
  i) Adsorbing graphene oxide on an electrode surface,
  ii) Creating pores in the graphene oxide, to obtain porous graphene oxide adsorbed on the electrode surface.

Furthermore, according to yet a further aspect of the invention, there is now provided a capacitive vapor sensor prepared according to this novel process.

It is to be understood that the "graphene oxide" adsorbed on the electrode surface in step (i) is a non-porous graphene oxide, namely a graphene oxide which has not been treated by any of the numerous processes to obtain pores in its structure. This can be determined by a SEM imaging, as detailed before.

Preferably, the graphene oxide used in this step, namely the non-porous graphene oxide, is applied as a solution or as a suspension.

The term "solution" is defined herein as an aqueous medium that is substantially free of "insoluble" particles. The term "suspension" is defined herein as an aqueous medium that comprises an "insoluble" particle component. The term "insoluble" is defined herein as the characteristic of being visible to the unaided eye, when in an aqueous suspension.

The term "aqueous medium" is meant to include water or a mixture of water and other water-miscible solvents (e.g. lower alcohols, ethers etc.).

The adsorption of the GO to the electrode can be affected for example by contacting the non-porous GO with the electrode.

The term "contacting" refers to establishing either a physical or a chemical adsorption of the GO onto the electrode surface.

The term "chemical adsorption" refers to a molecule (e.g., a GO or pGO molecule), adsorbed to the electrode surface chemistry via chemical bonding. For example via hydrogen bonding, ionic bonding, two thiol bonds, electrostatic bonds or other "weak" chemical bonds.

The term "physical adsorption" refers to molecules (e.g., a GO or pGO molecule) adsorbed to the electrode surface by weak molecular physical interactions, such as van der Waals interactions.

Adsorption of GO onto the electrode surface is made by drop casting the GO suspension or solution (i.e. when GO is in liquid state) onto the electrode, and semi-drying the modified electrode at room temperature.

Drop-casting is a widely used method to form films or thin covers by depositing consecutive drops of a solution on the surface to be coated, and allowing the solvent to evaporate.

It is noted that the inventors have shown that pre-dried graphene oxide (namely, GO which was not dried in-situ on the electrode) will not attach to the electrode surface. Without being bound to any specific theory, this is probably due to its functional groups not being active in its dry state, as in its liquid state.

The in-situ drying of the GO on the electrode surface is preferably done at temperatures ranging from about 10° C. to about 60° C. However, the drying can be affected at temperatures that are even higher than 60° C., thereby lowering the adsorbing time (namely the drying time).

The contacting is affected for an incubation time that is suitable to achieve the adsorption. Often, this incubation time is of at least 5 minutes, but it may be longer, for example even 1 hour or longer. As known to any person skilled in the art, thicker GO suspensions (namely more concentrated GO suspensions) would result in a longer incubation time being required.

The in-situ creation of the pores within the GO attached to the electrode surface can be affected by a number of methods and processes known in the field, some of which are listed herein. These include, but are not limited to, hydrothermal, irradiation, polymerization, grafting, template based, annealing, electroplating deposition, oxidative coupling of primary amines, steam etching, expansion and freeze-drying.

It should be emphasized that while these and other methods are known as possible processes to create porous GO, the gist of the invention lies in the initial adsorption of the GO onto the electrode, before the drying thereof and/or formation of pores, followed by an in-situ formation of pores therein.

Some of the known processes for creation of pores are detailed below:

Irradiation may be used to create nano-scale pores across a 10 μm thick graphene oxide. For example by using gamma ray irradiation in hydrogen at an irradiation dose of 500 kGy.

Polymerization and grafting may also be used to create pores in the GO. For example, hydrogels can be prepared by polymerization and grafting of acrylamide and 2-acrylamido-2-methylpropane sulfonic acid onto the starch in the presence of $CaCO_3$ and graphene oxide. $CaCO_3$ solid porogens are then removed by washing with acid and porous structures are obtained Template based process may be used to create pores by utilizing Ni foam as a template. This method uses nickel foam, graphene oxide, acetylene black as conductive agent, poly vinylidene fluoride (PVDF) as a bonding agent, and N-methyl pyrrolidone (NMP) as solvent. The materials are mixed and the mixture is grinded. The grinded composites are coated on the nickel foam, and dried for 12 h at 120° C. under vacuum to obtain the 3D graphene/Ni foam composite. Finally, this 3D graphene/Ni foam sample is immersed into a $FeCl_3$:HCl solution (1 M:1 M) to etch metal nickel, and the 3D graphene foam is obtained and retains the 3D macroscopic morphology structure.

Annealing may also be used to create pores. For example, in an exemplary process, porous graphene film (PGF) electrodes with controllable pore size (38-450 nm) are prepared by introducing defects and extra edges into graphene using GO and a metal salt as sources, via a facile method including filtration, annealing and subsequent removal of the metal. The term "annealing" as used herein refers to drying, as detailed above.

Electroplating deposition may be used to create pores by electrochemical reduction of GO in aqueous dispersion, to obtain a highly porous, conductive 3D graphene architectures (ERGO).

Steam etching may also be used to create pores. The etching mechanism under steaming is analogous to coal gasification, where carbon atoms react with $H_2O$ vapor to produce CO and $H_2$, leaving behind carbon vacancies that eventually grow into large pores.

Expansion and oxidative coupling of primary amines may be used to create spacers in between graphitic planes of graphite oxide, thereby creating pores. For example, this process may include benzene-1,4-diboronic acid (DBA) used as spacers to create pores in the graphene oxide, linked through covalent bonding.

Hydrothermal process may be used to create pores by self-assembly of graphene oxide followed by freeze-drying thereof.

Freeze-drying may be used to create pores by drying the solidified GO/water mixture under vacuum. The term "freeze-drying" refers to the process where a product is initially frozen, and then dried from the frozen state. The terms "freeze drying" and "lyophilisation" are used interchangeably to describe the same process. The freeze drying may be achieved in one step or in several steps.

Heating of ammonium carbonate may also be used to create pores by expulsion of dissolved gases, such as ammonia or carbonate, employing the heat.

For example, according to one preferred embodiment of the present invention, the creating of the pores in the graphene oxide was obtained by heating a suspension of graphene oxide and ammonium carbonate, which was drop casted onto the electrode, to obtain a porous graphene oxide film adsorbed on the electrode.

The term "film" is generally defined as being a thin layer or coating, or a thin sheet of any material. The term "film," as used in relation to the present invention, is intended to encompass a coating of the graphene oxide that has been applied to the electrode surface, either before the drying thereof, or after it has been dried and pores have been created therein to provide the porous graphene oxide. The use of the term "film" is not intended to impart any limitation in regard to the thickness of the GO or pGO coating on the electrode.

In this preferred embodiment, detailed in Example 1B further below, the adsorbing of the graphene oxide on the electrode surface was achieved by contacting the electrode surface with a graphene oxide-ammonium carbonate suspension, to obtain an assembly consisting of an electrode coated with the graphene oxide-ammonium carbonate suspension, further wherein the creating of the pores in the graphene oxide was obtained by heating this assembly to about 100° C. for several minutes to obtain a porous graphene oxide film adsorbed on the electrode.

The corresponding ammonium carbonate decomposition reaction is:

Figure 9A:
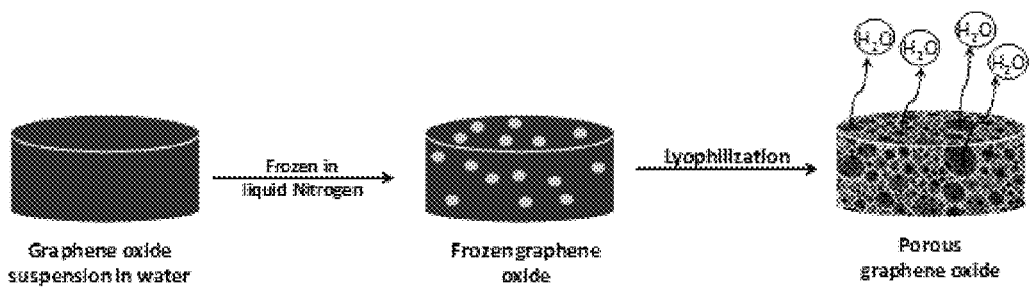
FIG. 9A depicts the scheme for process of example 1A for the preparation of pGO utilizing freeze drying method.
Figure 9B:
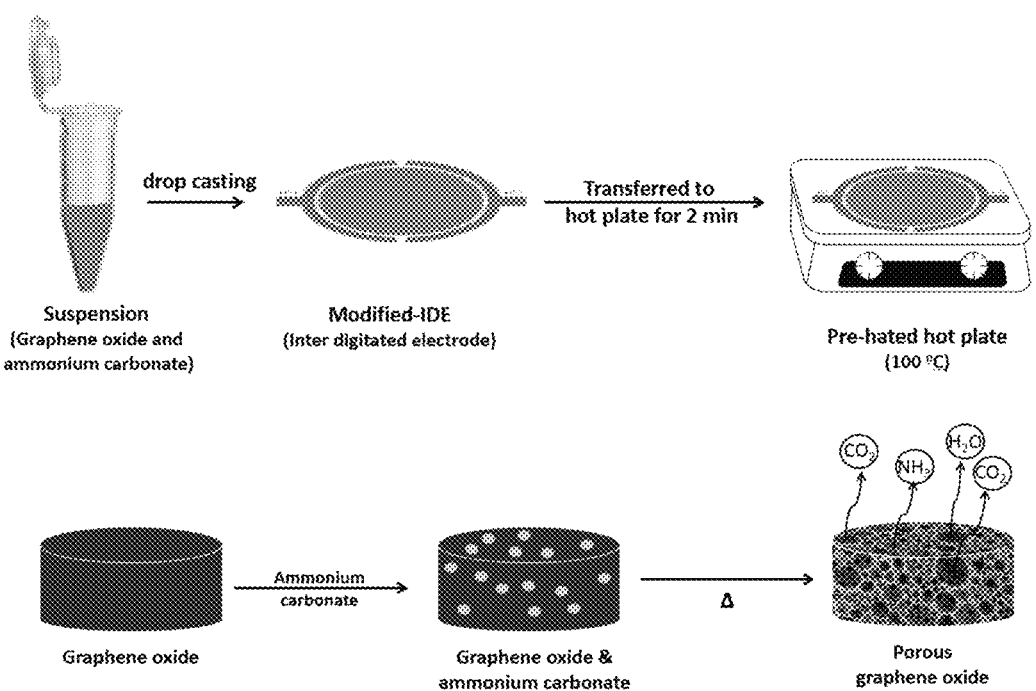
FIG. 9B is a scheme depicting the process of Example 1B for the preparation of pGO using heating.
Figure 10:
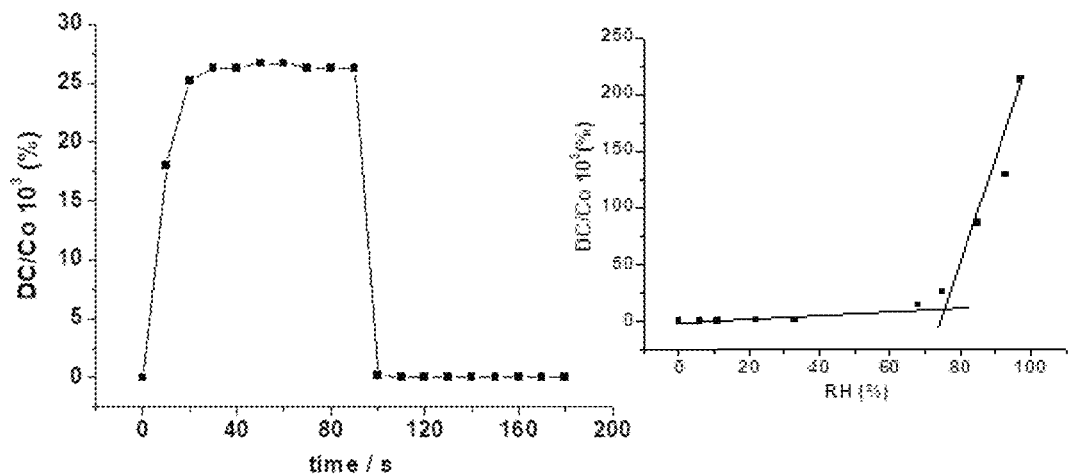
FIG. 10 depicts the capacitive gas sensing properties (humidity and ammonia) of a pGO sensor prepared according to the process of Example 1B.
Figure 10:
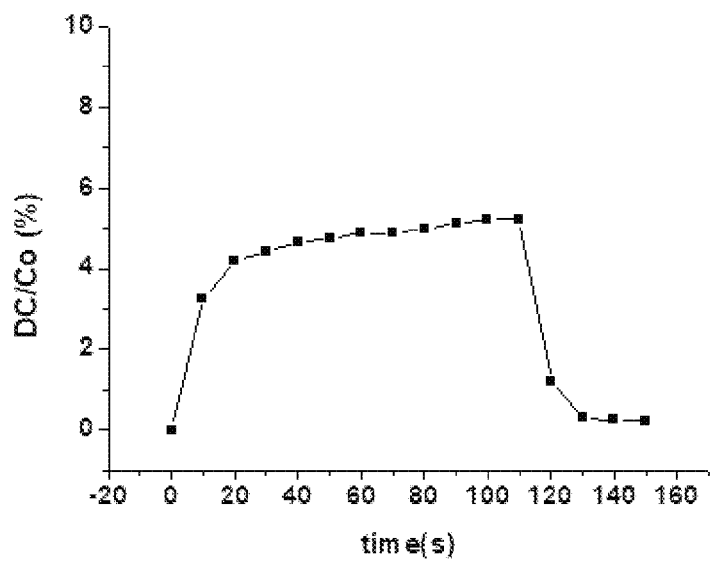

The process is depicted in FIG. 9B. As also shown in FIG. 10, the pGO electrode prepared according to this process showed good capacitive gas sensing towards several vapors, including for testing humidity and ammonia. FIGS. 11A-1D show the SEM images of GO and pGO electrodes prepared according to this process, and proves the porosity obtained in this process.

In another particular case, the novel in-situ process comprised a combined room-temperature annealing to achieve the initial adsorption to the electrode, followed by a freeze-drying process of the electrode coated by the GO suspension to achieve the porosity of the GO. The pGO-based capacitive vapor sensor design and characterization of the dielectric pGO vapor adsorption substrate are presented in FIGS. 1A and 1B. According to this preferred embodiment, pGO was prepared through a new in-situ assembly method, in which a GO dispersion (prepared via the modified Hummer's method, see Zhao et al. ACS Nano 2010, 4, 5245) was placed upon the electrode surface; followed by a gradual drying process at room temperature, and then undergoing a freeze-drying process, producing a pGO layer immobilized upon the electrode surface.

Thus, according to one preferred embodiment of the present invention, the adsorbing of the graphene oxide (non-porous graphene oxide) on the electrode surface was achieved by contacting the electrode surface with a graphene oxide solution or a graphene oxide suspension, followed by slow drying of the graphene oxide solution at room temperature to obtain an assembly consisting of an electrode coated with a partially-dried graphene oxide, further wherein the creating of the pores in the graphene oxide was obtained by freeze-drying the assembly to obtain a porous graphene oxide film adsorbed on the electrode.

The term "assembly" as used herein refers to the electrode and the adsorbed graphene oxide, prior to the drying and creating of the porous graphene oxide.

Figure 1B:
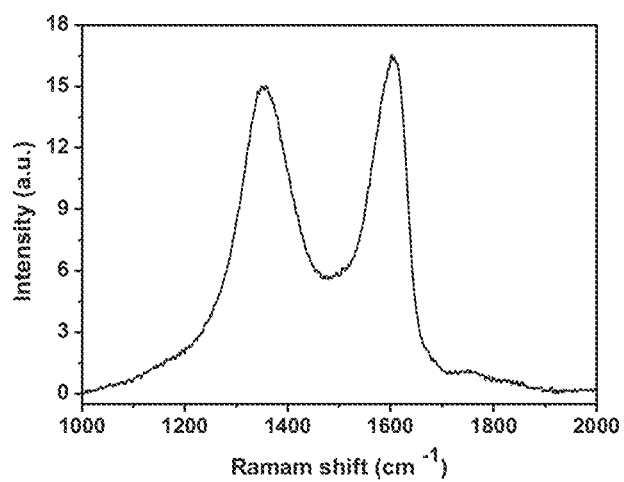
FIG. 1B depicts the Raman spectrum of the pGO matrix.

The scanning electrode microscopy (SEM) image in FIG. 1A reveals the remarkable porous structure of the pGO, underscoring the high surface area available for gas adsorption. As shown in the comparable reference process that follows in the Experimental section below, separately preparing pGO and then placing it on the electrode was not successful, as the pGO film fell from the electrode during the process. Further SEM analysis indicated that the open pore structure was not present in the starting GO material (prior to the freeze drying process). The Raman spectrum in FIG. 1B depicts a relatively high intensity of the G-band corresponding to the first order scattering of the $E_{2g}$ at 1590 cm$^{-1}$ and the D band corresponds to the size of the in plane sp$^2$ domains, confirming that the oxidized GO matrix was retained following the freeze drying process and that no reduction occurred. This aspect is crucial since the performance of the capacitive vapor sensor would be adversely affected if charge carriers would have been introduced in the porous material thereby disrupting the dielectric profile of the material.

FIGS. 2-4 present the extraordinary vapor detection properties of the pGO-based capacitive sensor towards different target molecules. The ammonia sensing results in FIGS. 2A-2C attest to the recycling capability, rapid response and recovery times, and high sensitivity of the pGO capacitive sensor prepared according to the process of Example 1B.

FIG. 2A depicts the response and recovery time analysis for ammonia gas (at a concentration of 50 ppm) and shows rapid uptake and release of the ammonia vapor molecules by the pGO matrix.

Specifically, the ~15 sec and ~10 sec response and recovery times, respectively, are extremely short (on par or better than corresponding reported values for ammonia gas sensors).

The concentration-dependence capacitance profile in FIG. 2B further reflects the excellent detection properties of the pGO-based capacitive sensor.

Figure 3A:
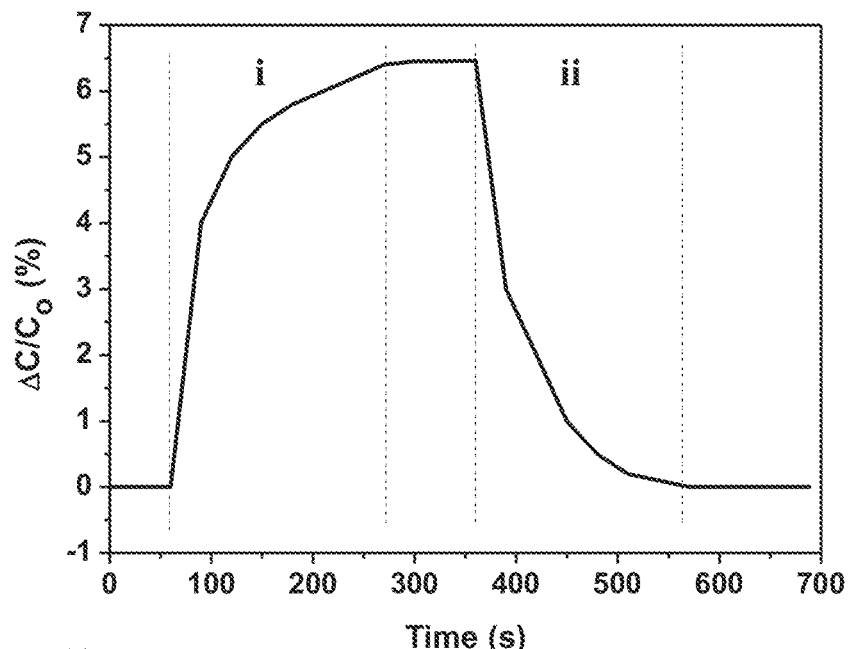
FIGS. 3A and 3B depict the response and recovery time of ammonia.
Figure 3B:
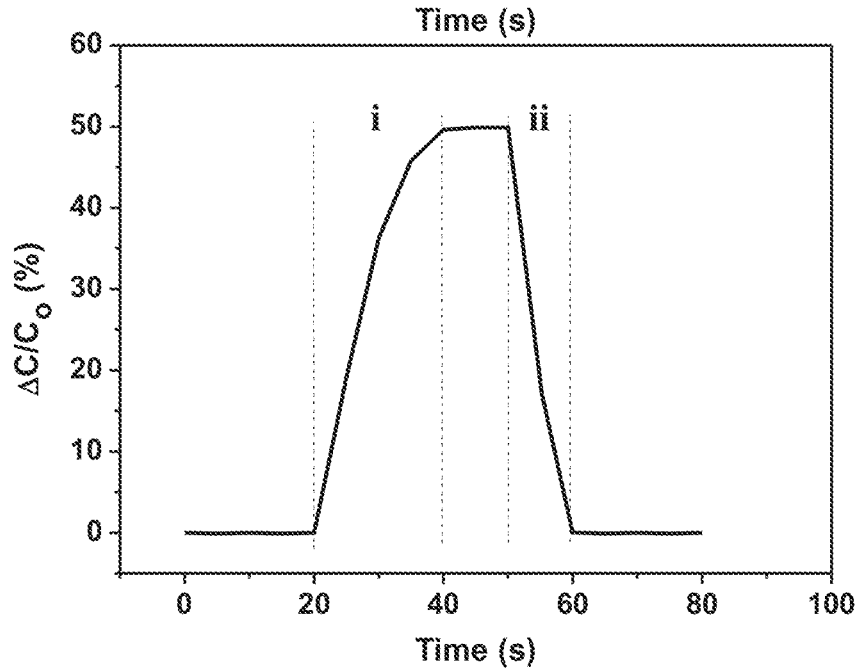

Importantly, thorough drying of the ammonia vapor samples were carried out prior to measurements to eliminate background response due to water vapor, see Experimental section. The sensitivity threshold of 1 ppm (FIG. 2B) is extremely low and points to feasibility of using the pGO-based sensor for practical applications. Indeed, the sensor-response graph in FIG. 2C demonstrates linearity of capacitance response in the important $NH_3$ concentration range of 1-70 ppm. It should be noted that the ammonia sensing parameters recorded for non-porous GO (i.e. GO deposited upon the electrode surface before the freeze-drying stage) revealed lower sensitivity and significantly longer response and recovery times (FIG. 3A vs. FIG. 3B). In particular, as non-porous GO has no pores in its adsorbed structures, the accumulation of the VOC will be less at the electrode surface when it is exposed to VOC environment and hence the change in the capacitance response will be obviously less when compared to porous GO structures.

It is noted that the term "sensitivity threshold" may be construed as referring to, for example, a minimum concentration of the target molecule or analyte. In many of the examples detailed below the sensitivity threshold was 1 ppm.

Application of the pGO capacitive sensor for humidity monitoring is depicted in FIGS. 4A-4C. Similar to the ammonia detection results outlined above (FIGS. 2A-2C), the pGO capacitive sensor exhibits extraordinary sensitivity to humidity and features a substantial dynamic range. In particular, the sensor was capable of reporting on a very low relative humidity (RH) value of 6% (FIG. 4A). This result is notable since very few reported humidity sensors could achieve such a low detection threshold. It should be also emphasized that this threshold might, in fact, be even lower; the limitation in this case is not related to sensor performance, but rather the absence of a standardized humidity sample having <RH 6%.

Inspection of FIG. 4A also reveals that the capacitive dynamic range of the pGO sensor for humidity measurements approaches $4 \times 10^6$% (FIG. 4A), which is two and three orders of magnitude greater than previously-reported GO-based humidity sensors.

As employed herein, the term "dynamic range" means the ratio or difference between the smallest and largest possible values of a changeable quantity (e.g., without limitation, amplitude; magnitude).

Also striking is the extremely rapid response and recovery times (FIG. 4B);

Response time is the time required for the sensor to respond to a step concentration change from zero to a certain concentration value. Recovery time is the time it takes for the sensor signal to return to its initial value after a step concentration change from a certain value to zero. As known to a person skilled in the art, both the response time and the recovery time are dependent on the electrode properties, i.e. thickness of the pGO film on the electrode surface. As can be seen in the examples which follow, the response and recovery times are defined as per specific concentrations of the target analyte.

According to one preferred embodiment of the present invention, at the tested concentrations of target analytes, the response time of the sensors are lower than 50 seconds, and the recovery times are lower than 40 seconds. However, at times, longer times may be obtained. For example, acetonitrile response time and recovery time are longer, probably due to the relatively stable interaction between the functional groups of the pGO and acetonitrile.

The response and recovery times also depend on the type of the VOCs or gas, the type of the electrode material (for example: porous, non-porous, conductive, nonconductive or semi conductive), the type of electrode principle used (for example, a capacitive or resistive type).

Recovery and response time range cannot be defined as they depend particularly on the type of VOC and the electrode material used. Using the process of the present invention, it has been established that significantly shorter response and recovery times were obtained for almost all tested VOCs at given target analyte concentrations.

Regarding humidity detection, the values indicated (20 seconds response time, 15 seconds recovery time) are similar or better than the parameters obtained in most humidity sensors reported in the literature or commercially-available. The linear responses apparent over the entire RH dynamic range (6%-97%, FIG. 4C) is a further indication for the applicability of the pGO capacitive sensor as a versatile and effective humidity sensor.

Interestingly, FIG. 4C reveals two linear windows in the capacitance response to water vapor, one between 0-65%, while another linearity is apparent between 65-97%. The two distinctive linear response domains likely correspond to different adsorption mechanisms of water onto the pGO surface, each predominant in a different concentration range. Two (or more) adsorption regimes have been previously observed in case of vapors and solute molecules. For example, two linear regions of water adsorption onto porous graphene oxide were ascribed to a transformation between a monolayer chemisorption and multilayer physisorption. Such combined adsorption mechanisms could determine the two linear sensing regimes in the pGO system depicted here, as the low-concentration linearity (FIG. 4C) might be due to initial water monolayer formation, followed by multilayer stacking in higher humidity giving rise to the second sensor linearity (FIG. 4C).

Figure 5A:
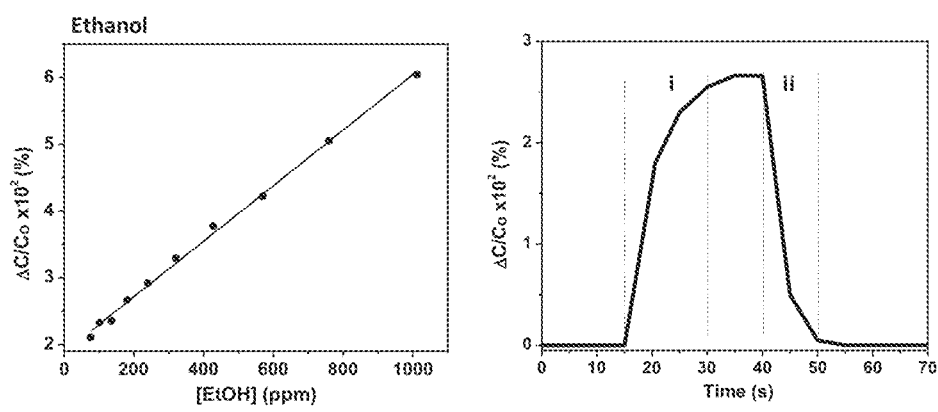
FIGS. 5A and 5B the sensing of volatile organic compounds (VOCs) by the pGO capacitive sensor of the present invention.
Figure 5B:
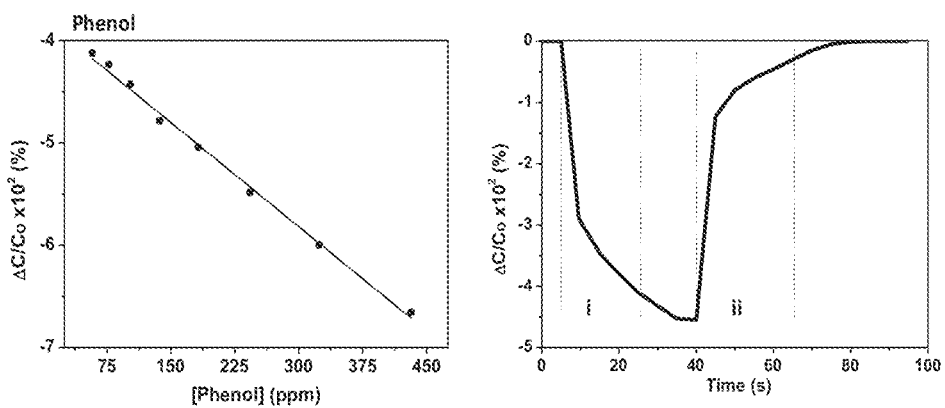

Application of the pGO capacitive sensor for detection of volatile organic compounds (VOCs) is shown in FIGS. 5A and 5B. FIGS. 5A and 5B demonstrate that the pGO-based sensor exhibits good sensitivity and wide dynamic range for a diverse set of molecules, including alcohols (polar VOC, FIG. 5A), and phenol (non-polar VOC, FIG. 5B). Specifically, dramatic capacitance changes were recorded in case of ethanol at a range of 70-100.00 ppm, with response linearity in the particularly-important analytical window of 70-1000 ppm and a capacitance response was observed even over the wider range 70-10,000 ppm) (results not provided);

Achievement of such a low detection threshold and broad sensing range is essential in practical ethanol sensing applications such as breath analysis and cardiopulmonary disease monitoring.

High sensitivity and wide dynamic range were recorded also for methanol (FIG. 8B), noting a rapid response (15 sec) and recovery times (10-15 sec) (FIG. 8B), reflecting its efficient adsorption/desorption. These parameters further point to the potential of the pGO capacitive sensor for practical applications. Similar attractive sensing profiles were apparent in case of representative hazardous VOCs, specifically acetonitrile (a polar molecule, FIG. 8C) and benzene (non-polar VOC, FIG. 8D). For both acetonitrile and benzene, a linear sensitivity range of between approximately 500-3000 ppm was apparent (FIG. 8C-D).

High sensitivity and wide dynamic range were recorded also for phenol (FIG. 5B), a slowly-degrading carcinogenic substance. Notably, the capacitance of pGO upon phenol adsorption became more negative upon increasing concentrations of the vapor, which is a known phenomenon as non-polar molecules decrease the polarity of the dielectric matrix.

Table 1 below shows the results of the analysis of ammonia vapor with the novel pGO/IDE sensor of the present invention, as compared to GO/IDE capacitive sensor prepared as a reference in the present study, and as compared to several reported non-capacitive sensors (FET and Resistive). It demonstrates the advantage of the present sensor in terms of response/recovery times and dynamic range.

TABLE 1

| SENSING MATERIAL | SENSOR STRUCTURE | RESPONSE TIME(S) | RECOVERY TIME (S) | DYNAMIC RANGE | REMARKS |
|---|---|---|---|---|---|
| RGO/MnO2/PANI | Resistive -type | 1080 | 240 | 0-50 ppm | |
| RGO/ANI | Resistive -type | 1080 | 170 | — | |
| RGO/ANI/PANI | Resistive -type | 1080 | 120 | — | |
| RGO/Py | Resistive -type | 1.4 | 76 | 1 ppb-50 ppm | |
| RGO/Py | Resistive -type | 720 | 325 | 5 ppb-00 ppm | |
| GR/Au | Resistive -type | 1200 | 3800 | 15-58 ppm | |
| GR | FET | — | — | — | |
| GR | Resistive -type | 21600 | 21600 | 0.5-1000 ppm | |
| GR/PANI | Resistive -type | 50 | 23 | 1-6400 ppm | |
| GR/mica substrat | FET | 60 | — | 20-100 ppm | |
| GR gated by ionic solid | FET | 33 | — | 9-2400 | |
| Printed GR/ PEDOT: PSS | Resistive -type | 180 | 300 | 25-1000 | |
| RGO/P3HT | Resistive -type | 141 | 488 | 10-50 | |
| RGO/Tannic acid | Resistive -type | 40 | 170 | 1310-6550 | |
| RGO/Cu(OH) 42-/Cu2O | Resistive -type | 28 | 206 | 100-500 | |
| pGO/IDE | Capacitive | 20 | 10 | 1-65 ppm | Present invention |
| GO/IDE | Capacitive | 210 | — | 40-100 ppm | comparative |

RGO reduced graphene oxide,
GR Graphene,

TABLE 1-continued

| SENSING MATERIAL | SENSOR STRUCTURE | RESPONSE TIME(S) | RECOVERY TIME (S) | DYNAMIC RANGE | REMARKS |
|---|---|---|---|---|---|

PPD p-phenyldiamine,
DMMP dimethyl methyl phosphonate,
PANI polyaniline,
ANI aniline,
Pypyrrole,
COP Chemical oxidative polymerization,
FET field-effect transistor RGO, or reduced graphene oxide, is the derivate of graphene oxide where the surface functionalities such as epoxy (C—O—C), hydroxyl (—OH) and carboxyl (—COOH) get reduced and form a conductive material, as opposed to GO which is an insulator and thus can be used in capacitive sensors.

Table 2 presents the results of the relative humidity response with the sensor of the present invention, compared with those of the prior art sensors.

TABLE 2

| Sensor type | Sensing material | Response and recovery time | Measurement range | Remarks |
|---|---|---|---|---|
| Capacitive-type | Graphene oxide | 5 s and — | 25-65% RH | |
| Capacitive-type | Graphene oxide | 10.5 and 41 s | 15-95% RH | |
| Capacitive-type | Graphene oxide/PDDA | 3-5 min and — | 11-97% RH | |
| Capacitive-type (simulation) | Graphene oxide | 0.2 s and — | 0-100% RH | |
| Capacitive type | Porous graphene oxide | 20 s and 15 s | 6-97% RH | Present invention |

"and —" stands for no information on the recovery time

Table 3 presents results of the analysis of volatile organic compounds (VOCs) with the Capacitive sensor of the present invention. No comparative report is available of GO based capacitive sensor for VOCs.

TABLE 3

| Target | Response and recovery time | Linearity range |
|---|---|---|
| Ethanol | 15 s and 10 s | 68-1000 ppm |
| Methanol | 15 s and 15 s | 350-2600 ppm |
| Acetonitrile | 150 s and 50 s | 600-3000 ppm |
| Benzene | 15 s and 15 s | 560-3200 ppm |

As can be seen from these and other examples, the novel sensor of the present invention, can be successfully used for the detection of a wide range of analytes, including VOCs.

Thus, according to yet another aspect of the invention, there is provided a use of the sensor described hereinabove for detecting the presence of one or more vapor analytes in a vapor sample.

According to yet an additional aspect of the invention, there is also provided a method for detecting the presence of one or more vapor analytes in a vapor sample, this method comprising passing a vapor sample through the capacitive vapor sensor described hereinabove.

As detailed in the experimental section further below, the samples can initially be in a liquid form, and are then evaporated to convert them to a vapor state. Vapors were generated through evaporation of corresponding liquefied materials according the following equation (Kalita, S. et al., J. Mater. Chem. C 2015, 3, 10767, Y. V. Kaneti et al., Phys. Chem. Chem. Phys. 2014, 16, 11471):

$$C_{ppm} = \frac{V_{\mu L} D_{gmL^{-1}}}{M_{gmol^{-1}t^{-1}} V_{mL}} \times 2.24 \times 10^7$$

where $C_{ppm}$ is the required vapor concentration, $V_{\mu L}$ is the volume of the liquid analyte, $D_{gmL}^{-1}$ is the density of the liquid, $V_{mL}$ is the volume of the test chamber and $Mg_{mol}^{-1}$ is the molecular weight of the liquid analyte. All the subscripts are the corresponding units.

To carry out the vapor target analyte (such as ammonia, ethanol, phenol, toluene, cyclohexane, methanol, acetonitrile and benzene) appropriate volumes of the vapors (liquid) are injected into a preheated airtight glass 1 L chamber using a microsyringe.

The vapor is subsequently passed through another chamber containing the drying agent and the dried chemical vapor is injected to a gas chamber containing the pGO-sensor and a probe of PID VOC sensor.

Preferably, the vapor analytes can be selected from water, ammonia, volatile organic compounds, polar and non-polar volatile molecules.

In conclusion, the inventors have now demonstrated a new process to obtain an excellent capacitive sensor for gases and volatile species based on porous graphene oxide as the dielectric substance, which is immobilized to the electrode surface. The data presented indicate that the embedded pGO is the critical determinant in the capacitive detector, responsible for the extraordinary sensing properties of the system, specifically low detection thresholds recorded for diverse gas molecules, recyclability, short response and recovery times, and applicability for diverse target molecules. Indeed, pGO provides a highly porous, open, and extended surface area scaffold available for anchoring vapor molecules.

Moreover, the presence of varied polar molecular units (such as OH and COOH) and non-polar units (graphitic rings) as functionalized graphene oxide units, promotes adsorption of both polar and non-polar vapor molecules and consequent modulation of the dielectric properties of the material. The capacitive sensor is easy to assemble and operate. Particularly important, preparation of the pGO matrix is simple utilizing inexpensive and readily available building blocks. Moreover, besides the high porosity and expanded surface area available for adsorption of volatile substances, pGO can offer a means of selectivity through implementation of diverse surface functionalization routes of the GO scaffold.

Unless otherwise defined, all technical and scientific terms used herein have the same meaning as is commonly understood by one of skill in the art to which this invention belongs.

EXPERIMENTAL SECTION

Materials

Graphite powder (Alfa aesar, 99% metal basis), Sodium hydroxide (Frutarom, Ltd), Lithium chloride (Sigma-Aldrich), Magnesium chloride (Sigma-Aldrich), Potassium iodide (Frutarom, Ltd), Sodium chloride (Bio-Lab Ltd., Israel), Potassium sulfate (Frutarom, Ltd), Phosphorous pentoxide (Alfa aesar), ammonium chloride (Sigma-Aldrich), potassium hydroxide (Frutarom, Ltd), absolute ethanol (Carlo erba) and methanol (Bio-Lab Ltd., Israel), phenol (Sigma-Aldrich), aniline (Sigma-Aldrich), dodecylamine (Sigma-Aldrich), ethanolamine (Sigma-Aldrich) and thionylchloride (Sigma-Aldrich), acetonitrile (Sigma-Aldrich) and benzene (Sigma-Aldrich).

Sensor Construction

The sensors were fabricated using gold interdigitated electrodes (IDEs) prepared by photolithography on a Pyrex substrate (2×5 mm, 0.5 mm thickness). Electrode dimensions were 4 mm length, 60 μm thickness, 10 μm wide, and 10 μm distance between adjacent conductive areas. The IDEs were prepared in the MEMS facility of Tel Aviv University. The Pyrex substrates were mounted on TO-39 bases using nonconductive epoxy resin as standard 2-wire bonding (Beckermus, IL).

Preparation of Graphene Oxide and Functionalized-Graphene Oxide

Pristine graphite oxide was synthesized from graphite powder using a modified Hummer's method (Zhao et al. *ACS Nano* 2010, 4, 5245).

Several functionalized graphene oxides (FGO) were prepared based on Dreyer et al. (Chem. Soc. Rev., 2014, 43, 5288) and Rajendiran et al. (Phys.Chem.Chem.Phys. 2015, 17, 11329):

To prepare the GO derivatives, the carboxylic functional groups of GO were subsequently activated by suspending the graphite oxide (500 mg) in $SOCl_2$ (60 mL) solution and stirring for 24 hours at 70° C. Solution mixture was then filtered and washed with anhydrous tetrahydrofuran (THF). The obtained product (GO—COCl) was dried under vacuum for 24 h at room temperature.26

The different functionalized-GO materials, phenyl-GO (FIG. 12-1), dodecyl-GO (FIG. 12-2) and ethanol-GO (FIG. 12-3) were prepared by dissolving GO—COCl (250 mg) in 100 mL double distilled water in an ultrasonic bath for 60 min. For preparing phenyl-GO, the GO—COCl suspension was transferred to a solution containing aniline in 2% acetic acid (500 mg in 10 mL) and the mixture was stirred for 1 h, followed by sonication for 20 minutes to make the solution nearly homogeneous and then the stirring was continued for another 24 h at room temperature. The obtained phenyl-GO solution was filtered and washed with double distilled water until the pH reached ~7 and dried at 65° C. under vacuum. Other GO derivatives, dodecyl-GO and ethanol-GO were similarly prepared by replacing aniline moiety by dodecylamine and ethaolamine, respectively, using the above procedure.

Methods

Scanning Electron Microscope (SEM) Analysis

The morphology of GO aerogel was observed by SEM. Porous graphene oxide film was prepared on silicon (1 0 0) and gold was coated using a sputter coater. The micrographs of GO and pGO were recorded using a JSM-7400 scanning electron microscope (JEOL LTD, Tokyo, Japan).

Raman Spectroscopy Analysis

Raman spectrum was recorded using a Jobin-Yvon LabRam HR 800 micro-Raman system equipped with a Synapse CCD detector by 514 nm Argon laser excitation source.

Capacitance Measurements

All capacitance measurements were carried out manually on LCR meter (Model 878B/879B, BK Precision, USA).

Generation of Chemical Vapors

Humidity Generation:

Different relative humidity (RH) environments were generated by saturated aqueous solutions of lithium bromide (6%), lithium chloride (11%), potassium acetate (22%) magnesium chloride (33%), potassium carbonate (43%), sodium bromide (58%), potassium iodide (68%), sodium chloride (75%), potassium chloride (85%), potassium nitrate (93%) and potassium sulfate (97%) in airtight glass vessel at a temperature of 25° C., which yielded RHs of 6%, 11%, 22%, 33%, 43%, 58%, 68%, 75%, 85%, 93% and 97%.

Further, the solid fine powder of phosphorous pentoxide was used to establish the 0±0.5% RH environment in airtight glass vessel at a temperature of 25° C.

Relative humidity values designated were also confirmed by a standard humidity and temperature sensor (TH 210, KIMO, Instruments, France).

Volatile Organic Vapor Generation:

Vapors were generated through evaporation of corresponding liquefied materials according the Kalita equation provided hereinabove.

To carry out the vapor (ammonia, ethanol, phenol, toluene, cyclohexane, methanol, acetonitrile and benzene) sensing experiment, using the pGO matrixes, appropriate volumes of the vapors (liquid) were injected into a preheated airtight glass chamber of 1 L for 1 minute. An appropriate volume of the analyte was injected into the test chamber by using a microsyringe.

The vapor was subsequently passed through another chamber containing the drying agent (details below). Then the dried chemical vapor was injected (using airtight syringe) to 1 L gas chamber containing the pGO-sensor and a probe of PID VOC sensor (MiniRAE Lite system, USA) for online vapor concentration measurements.

Suitable salts (~1 g) of calcium carbonate, phosphorous pentoxide and calcium chloride were used to dry the vapors of ethanol, methanol, acetonitrile and benzene, respectively, before measurement.

The demonstrated electrode, pGO/IDE was exposed to $P_2O_5$ atmosphere for 1 minute for every new measurement to remove residual water molecules from the porous structure.

Further, all measurements were made at room temperature and under ambient conditions. As the injected vapor was initially in the liquid form, it was evaporated to convert it to a vapor state. Once the maximum sensitivity of the sensors was reached, the chamber was opened in order to release the vapor or to allow the sensors to recover. The indicated vapor concentrations were confirmed by using a standard commercially available VOC sensor (MiniRAE Lite system, USA).

Ammonia Detection

Liquid ammonia is not best choice for the generation of required amount ammonia vapor. Instead, ammonia vapor was produced by reacting ammonium chloride solution (2.8 g/L) and potassium hydroxide solution (10%) in the test chamber (500 mL airtight glass vessel). Various concentrations of ammonia vapor were achieved by using ammonium chloride and potassium hydroxide solutions. For instance, 100 µL of both $NH_4Cl$ and KOH solution generates 1 ppm of ammonia; likewise 6.5 mL of both $NH_4Cl$ and KOH solution generates 50 ppm of ammonia, and so on. The KOH solution (at a higher concentration, 10% solution) is to produce ammonia vapor and used also as dissicant for ammonia vapor. Alternatively, ammonia vapor was generated by heating the ammonia solution and was used for testing after drying.

$CO_2$ Detection $CO_2$ was generated using Sodium carbonate and hydrochloric acid, and was dried using anhydrous $CaCl_2$ and used for sensing experiments.

Suitable concentration of chemical vapors was generated in an airtight glass vessel (500 mL) and respective capacitive changes were recorded manually. Three replicates were measured with selected chemical vapors to evaluate reproducibility.

Example 1A: Fabrication of pGO Immobilized on an Interdigitated Electrode (Immobilized pGO/IDE)

The pristine graphite oxide was synthesized from graphite powder using a modified Hummer's method (Zhao et al. *ACS Nano* 2010, 4, 5245) and was re-dissolved in double distilled water to obtain a graphite oxide solution (10 mg/mL) which was ultra-sonicated for 1 hour to obtain a stable graphene oxide (GO) suspension. This suspension (10 µL) was drop casted on an interdigitated electrode (IDE) and slowly dried at room temperature. After about 1 hour the GO-electrode was rapidly immersed in a cold source (liquid nitrogen) for 5 minutes. After the GO film on the IDE was completely frozen, the frozen GO/IDE was subsequently placed in a lyophilizer for 12 hours to remove the remaining water and obtain the final IDE-deposited porous GO which was used in some of the capacitive sensing experiments.

The same preparation method was repeated starting from functionalized graphene oxide, to enable the detection of specific chemical vapors, as detailed in Example 1C further below.

Example 1B: Protocol for the Synthesis of pGO Using Ammonium Carbonate

A graphene oxide-ammonium carbonate suspension was prepared by mixing of 50 µL of graphene oxide solution (10 mg/mL) and 50 µL of ammonium carbonate solution (500 mg/mL). The prepared suspension of 10 µL was drop-casted onto the gold interdigitated electrode (IDE) surface and then the electrode was transferred to preheated hot plate (100° C.) for 2 minutes. After 2 minutes, the electrode was removed from the hot plate and was kept aside for cooling. The obtained electrode was used for characterization and sensing experiments.

Example 1C: Fabrication of Functionalized Porous GO Based Sensors

To prepare functionalized graphite oxides, graphite oxide and ethanol-GO (each of 10 mg/mL) was re-dissolved in doubly distilled water, individually. Other derivatives, phenyl-GO and dodecyl-GO (each of 10 mg/mL) were re-dissolved in water-ethanol (10:90), separately. All solution mixtures were ultra-sonicated for 1 h to obtain stable suspensions. The dispersion of GO and its derivatives (10 µL) was drop-casted on an interdigitated electrode (IDE) and slowly dried at room temperature for an hour. Obtained electrodes, GO/IDE, phenyl-GO/IDE and dodecyl-GO/IDE and ethanol-GO/IDE were then rapidly placed in liquid nitrogen for 5 min. The frozen modified IDEs were subsequently placed in a lyophilization equipment for 12 hours to remove the remaining water and to obtain the porous GO film on IDEs (pGO/IDEs). The final electrodes were named as pGO/IDE, phenyl-pGO/IDE and dodecyl-pGO/IDE and ethanol-pGO/IDE, used in the capacitive based chemical vapor sensing applications.

Example 2: Capacitance Measurements of a Variety of Chemical Vapors on the Immobilized pGO/IDE The immobilized pGO/IDE electrode prepared according to Examples 1A, 1B and 1C, was used to determine the humidity, presence of ammonia and presence of several volatile chemical vapors, such as water, $CO_2$ etc. as described in the methods section above.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations that operate according to the principles of the invention as described. Therefore, it is intended that this invention be limited only by the claims and the equivalents thereof. The disclosures of patents, references and publications cited in the application are incorporated by reference herein.

The invention claimed is:

1. A capacitive vapor sensor comprising a pair of parallel metallic electrodes separated by a dielectric material, wherein said dielectric material is porous graphene oxide physically immobilized onto surfaces of the pair of metallic electrodes, further wherein said sensor is configured to change dielectric properties upon contacting vapor target molecules.

2. The sensor of claim 1 wherein said porous graphene oxide is a functionalized graphene oxide.

3. The sensor of claim 1, whereas the pair of parallel metallic electrodes are interdigitated electrodes.

4. An array of capacitive vapor sensors, constructed as an array of at least two array elements, wherein each array element comprises the sensor of claim 1, further wherein each array element comprises a different functionalized or non-functionalized porous graphene oxide.

5. A method for detecting the presence of one or more vapor analytes in a vapor sample comprising the steps of exposing the array of capacitive sensors of claim 4 to said vapor sample and recording a change in capacitance upon exposure.

6. An array of capacitive vapor sensors according to claim 4, wherein the functionalized porous graphene oxide is selected from the group consisting of phenyl-graphene oxide, dodecyl-graphene oxide and ethanol-graphene oxide.

7. A method for detecting the presence of one or more vapor analytes in a vapor sample comprising the steps of exposing the sensor of claim 1 to said vapor sample and recording a change in capacitance upon exposure.

8. The method of claim 7, wherein said vapor analytes are selected from water, ammonia, volatile organic compounds, polar and non-polar volatile molecules.

9. A method for detecting the presence of one or more vapor analytes in a vapor sample, said method comprising passing a vapor sample through the capacitive vapor sensor of claim 1.

* * * * *